United States Patent
Wu et al.

(10) Patent No.: US 6,898,684 B2
(45) Date of Patent: May 24, 2005

(54) CONTROL CHIP WITH MULTIPLE-LAYER DEFER QUEUE

(75) Inventors: Sheng-Chung Wu, Taipei Hsien (TW); You-Ming Chiu, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 116 days.

(21) Appl. No.: 10/065,378

(22) Filed: Oct. 10, 2002

(65) Prior Publication Data

US 2003/0088750 A1 May 8, 2003

(30) Foreign Application Priority Data

Nov. 7, 2001 (TW) ........................................ 90127631 A

(51) Int. Cl.⁷ .............................................. G06F 12/00
(52) U.S. Cl. ........................... 711/167; 711/169; 710/6; 710/25; 710/39; 710/58; 710/112; 710/306; 710/310; 710/313
(58) Field of Search ................................ 711/167, 169; 710/6, 25, 39, 58, 112, 306, 310, 313

(56) References Cited

U.S. PATENT DOCUMENTS 5,991,819 A * 11/1999 Young ........................ 709/253
6,073,190 A * 6/2000 Rooney ....................... 710/56
6,247,102 B1 * 6/2001 Chin et al. .................. 711/150

* cited by examiner

*Primary Examiner*—Donald Sparks
*Assistant Examiner*—Bao Q Truong
(74) *Attorney, Agent, or Firm*—J.C. Patents

(57) ABSTRACT

A control chip having a multiple-layer defer queue therein and a method of operating the control chip. The control chip is coupled to a CPU bus and a PCI bus. The control chip comprises of a PC request queue, a multiple-layer defer queue, a PCI access queue and a PCI controller. The multiple-layer defer queue facilitates the processing of a multiple of concurrent CPU requests that belong to a first request type. The multiple-layer defer queue supports retry and defer transactions, thereby reducing data transmission between the CPU and the control chip.

6 Claims, 3 Drawing Sheets

CONTROL CHIP WITH MULTIPLE-LAYER DEFER QUEUE

CROSS REFERENCE TO RELATED APPLICATIONS

This application claims the priority benefit of Taiwan application serial no. 90127631, filed on Nov. 7, 2001.

BACKGROUND OF INVENTION

1. Field of Invention

The present invention relates to a control chip having a defer queue and a method of operating the control chip. More particularly, the present invention relates to control chip having a multiple-layer defer queue and a method of operating the control chip.

2. Description of Related Art

At present, personal computer has a central processing unit (CPU) that connects with a control chip through a high-speed CPU bus. The control chip is connected to an AGP bus and one or more PCI buses. The PCI buses may couple with a number of PCI compatible peripheral devices or memory units. Since the CPU is at the core of a personal computer, any requests from the CPU through the PCI bus must be processed quickly and do not affect other requests demanded by the CPU are unaffected. In fact, fast response to a request is one of the factors that indicates the operating efficiency of a computer system.

Requests sent from the CPU to a PCI bus through the control chip can be grouped together under two major types. The first type includes requests such as input/output read (IOR), input/output write (IOW) and memory read (MEMR) and the second type includes requests such as memory write (MEMW). For the requests belonging to the first type, the CPU must obtain a response from the PCI bus in order to complete the transaction with respect to the first type request. For example, the control chip needs to receive requested data from the PCI bus before transmitting the requested data to the CPU. However, for a request belonging to the second type, the control chip has a buffer for holding the request. There is no need for the request to be immediately sent out. The control chip may respond directly to the CPU, and the central processing unit then regards that the transaction with respect to the second type request has been complete.

A conventional control chip only has a built-in one-layered defer queue (DFQ). When the CPU issues a request belonging to the first type and the corresponding defer bit is enabled (i.e. CPU request meets defer condition), the control chip will transfer the request to the DFQ for storage. Also and, a defer response is issued to inform the CPU that this request satisfies the defer condition. After the requested response data is transferred back via the PCI bus, the control chip initiates the transmission of requested response data to the CPU according to the stored requested data in the DFQ. This arrangement obviates the need for continuous retry of the CPU or occupation of the CPU bus for too long just to complete a CPU instruction. Ultimately, operating efficiency of the computer system is increased.

However, the one-layered defer queue can only process one defer transaction that meets the defer conditions. When the CPU issues a first-type request and the DFQ has already been occupied, then the control chip will issue a retry response to the CPU, causing the CPU to continuously issue the request to the control chip until the DFQ has space. Hence, overall performance of the system decreases.

In brief, conventional method for processing request from the CPU has the following drawbacks:

1. DFQ only has an one-layer when the DFQ is occupied, the CPU needs to repeatedly issue the request until the DFQ has space, due to the effect of retry. This slows down the operating speed of the system.

2. When the CPU issues a request belonging to the first type while the defer bit is still not enabled, due to that the DFQ of the control chip cannot store the first type request, the control chip will repeatedly issue retry response to the CPU. As a result, the CPU repeatedly issues the request to the control chip. This manner reduces the performance and efficiency of the whole system.

SUMMARY OF INVENTION

Accordingly, one object of the present invention is to provide a control chip having a multiple-layer defer queue and a method of operating the control chip so that a plurality of first type requests issued from a central processing unit (CPU) can be processed concurrently. Furthermore, the multiple-layer defer queue can support retry and defer transaction at the same time so that the amount of data flow between the CPU and the control chip is greatly reduced and overall performance of the system is improved.

The invention also provides a control chip with multi-layer defer queue, coupled to a CPU bus and a PCI bus. The control chip comprises a PCI request queue, which receives a CPU request from the CPU bus, and generating a PCI request record. A multi-layer defer queue respectively responds to the CPU bus by one of a defer response and a retry response when the CPU request is received. A PCI access queue is used to receive the PCI request record. Also and, a PCI controller receives the request from the multi-layer defer queue and causes the PCI request record of the PCI access queue to be transmitted to the PCI bus via the PCI controller. Wherein, when the PCI bus generates a response data and if the CPU request in the multi-layer defer queue is to produce the defer response, then the response data is directly sent to CPU bus. If the CPU request in the multi-layer defer queue is to produce the retry response and the CPU bus issues the CPU request, then the response data is directly transmitted to the CPU bus.

In brief, the multiple-layer defer queue facilitates the simultaneous processing of a plurality of CPU requests belonging to the first request type. Furthermore, the multiple-layer defer queue also supports retry and defer transactions. Since the volume of data transmitted between the CPU and control chip is reduced, efficiency and overall performance of the system is greatly improved.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
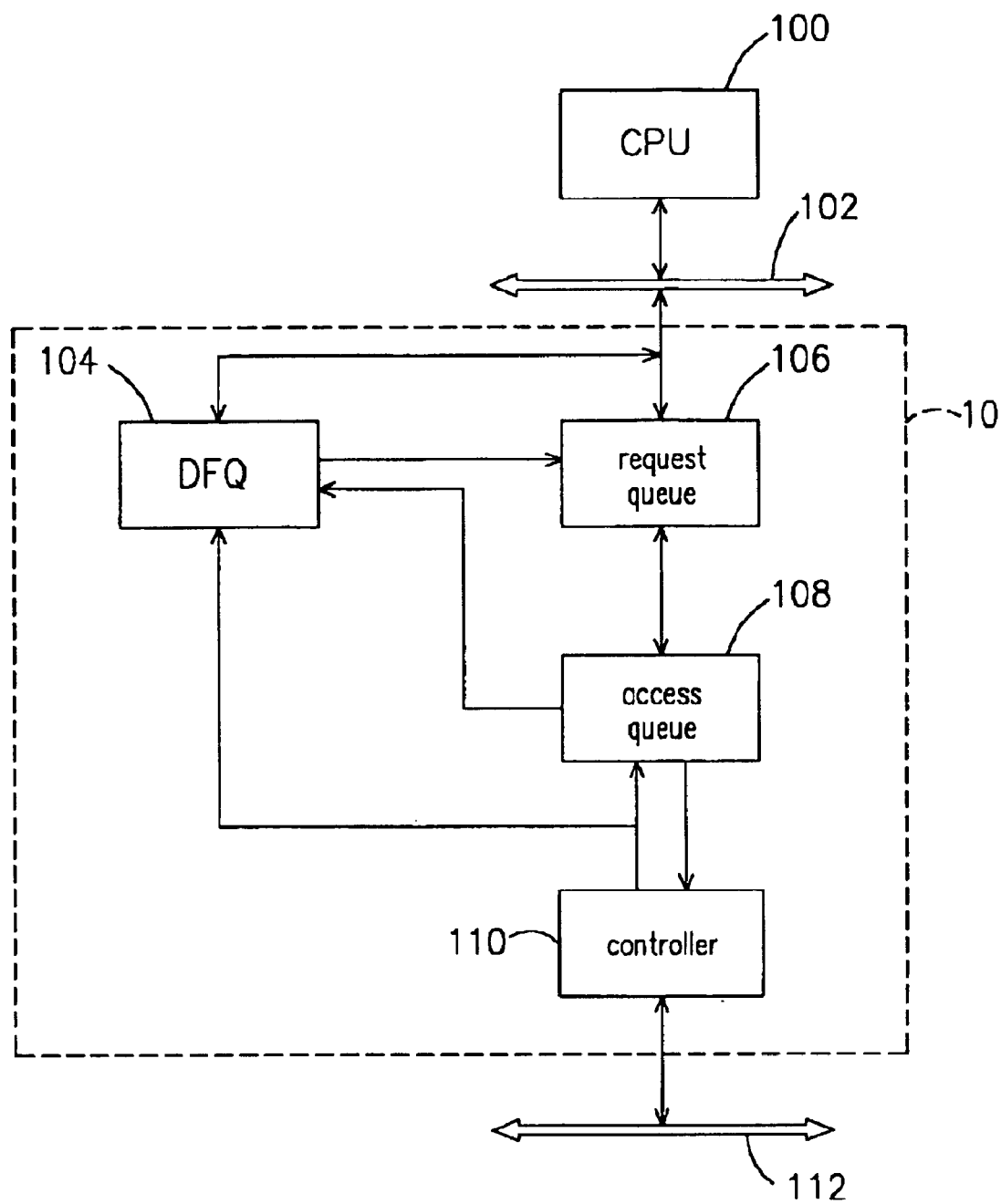
FIG. 1 is a block diagram showing a control chip having a multiple-layer defer queue therein according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

In the following embodiment, a two-layered defer queue is used as an example of the multiple-layer defer queue. However, anyone familiar with the technology knows that the invention is actually applicable to a multiple-layer defer queue having at least two layers.

FIG. 1 is a block diagram showing a control chip having a multiple-layer defer queue therein according to one preferred embodiment of this invention. As shown in FIG. 1, the control chip 10 is coupled to a CPU bus 102 and a PCI bus 112. The control chip 10 at least includes a PCI request queue (PCQ) 106, a multiple-layer defer queue (DFQ) 104, a PCI access queue (PAQ) 108 and a PCI controller (PCIC) 110. The multiple-layer defer queue 104 is able to store a plurality of defer request records, such as two. Each defer request record at least includes an identification code field, an effective data field and a flag field. The PCI request queue 106 and the PCI access queue 108 are able to store a plurality of PCI request records. Each PCI request record at least includes an identification code field. According to the foregoing structure of control chip with multiple-layer defer queue, it can be achieved to have multiple-layer defer queue to simultaneously support transactions of retry and defer by using the identification code field, the effective data field and the flag field.

When the CPU issues a second-type request at the CPU bus 102, this second-type request is stored in the PCI request queue 106, and the identification code field of the PCI request record will be filled with 00. The code 00 represents that this second-type request does not exit in the multiple-layer defer queue. Then, the control chip responds to the CPU again, causing the CPU to treat the second-type request as one request which has been accomplished. The second-type request together with the PCI request record are shifted to the PCI access queue 108 and wait for the PCI controller 110 to be sent to the PCI bus 112.

When the CPU issues a first-type request at the CPU bus 102, this first-type request is stored in the PCI request queue 106. If the multi-layer DFQ 104 is fully occupied, the control chip then issues a retry response to the CPU. Then, the identification code field of the PCI request record in the PCI request queue 106 is filled with 00. The code 00 represents that this first-type request does not exit in the multiple-layer defer queue. This first-type request and the PCI request record are not shifted to the PCI access queue 108. In other words, the retry response with respect to the first-type request is not sent by the PCI controller 110 to the PCI bus 112.

When the multi-layer DFQ 104 inside the control chip is not yet fully occupied, the first-type request is stored the multi-layer DFQ 104 and the PCI request queue 106, and the identification code fields of the DFQ request record and the PCI request record are filled with the same identification code, which is 01 or 10 because the invention has two DFQ layers with different identification codes. Then, according to whether or not the defer bit in the first-type request is enabled, it is determined to issue a defer response or a retry response to the CPU, which information will be stored in the flag field. After then, the first-type request together with the PCI request record are transferred to the PCI access queue 108 via the PCI request queue 106, and waits for being transmitted to the PCI bus 12 by the controller 110.

After the first-type request receives the response from the PCI bus and the responded data, wherein the status can be known from the content of 01, 10 in the identification code field, the PCI controller 112 will fill an enable into the effective data filed. If the first-type request is a defer response, which can be judged according to the flag field, then the data is directly sent to the CPU and the transaction accomplishes. The first-type request in the multi-layer DFQ 104 is deleted. If the first-type request is a retry response, which can be judged according to the flag field, then the data is temporarily stored in the control chip. When the next identical first-type request is issued by the CPU, then, the data is directly sent to the CPU and the transaction accomplishes. Then, the first-type request in the multi-layer DFQ 104 is deleted.

Additionally, in order to make the multiple-layer defer queue to simultaneously support transactions of retry and defer, when the CPU issues the first-type request, it is necessary to check whether or not the multiple-layer DFQ 104 has stored the first-type request, which may also be the first-type request of retry response previously issued by the control chip. When it is assured that the first-type request has been stored in the multi-layer DFQ 104, it should proceed another check to see whether or not the data in stored in the multi-layer DFQ 104 at the effective data field has the enable. (I) In the situation of disable, the control chip issues a retry response to the CPU. The identification code field of the PCI request record is filled with 00. This first-type request and the PCI request record are not stored in the PCI access queue 108. (II) In the situation of enable, the control chip will respond to the CPU with the data and the transaction accomplishes. The first-type request stored in the multi-layer DFQ is deleted. The identification code field of the PCI request record is filled with 00. The first-type request and the PCI request record are not shifted to the PCI access queue 108.

Figure 2:
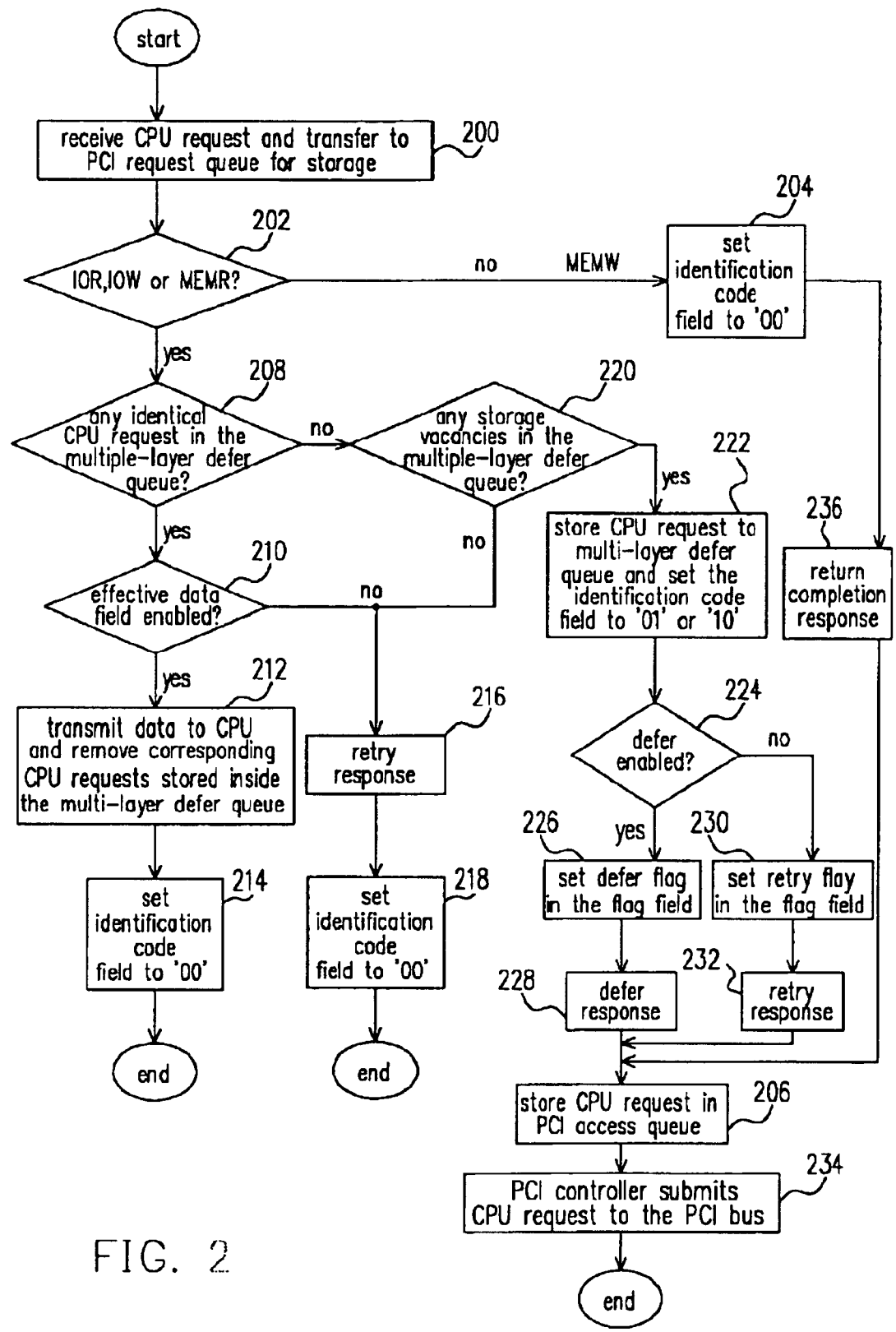
FIG. 2 is a flow chart showing the steps for a control chip having a multiple-layer defer queue therein to process CPU requests picked up from a CPU bus according to one preferred embodiment of this invention.
Figure 3:
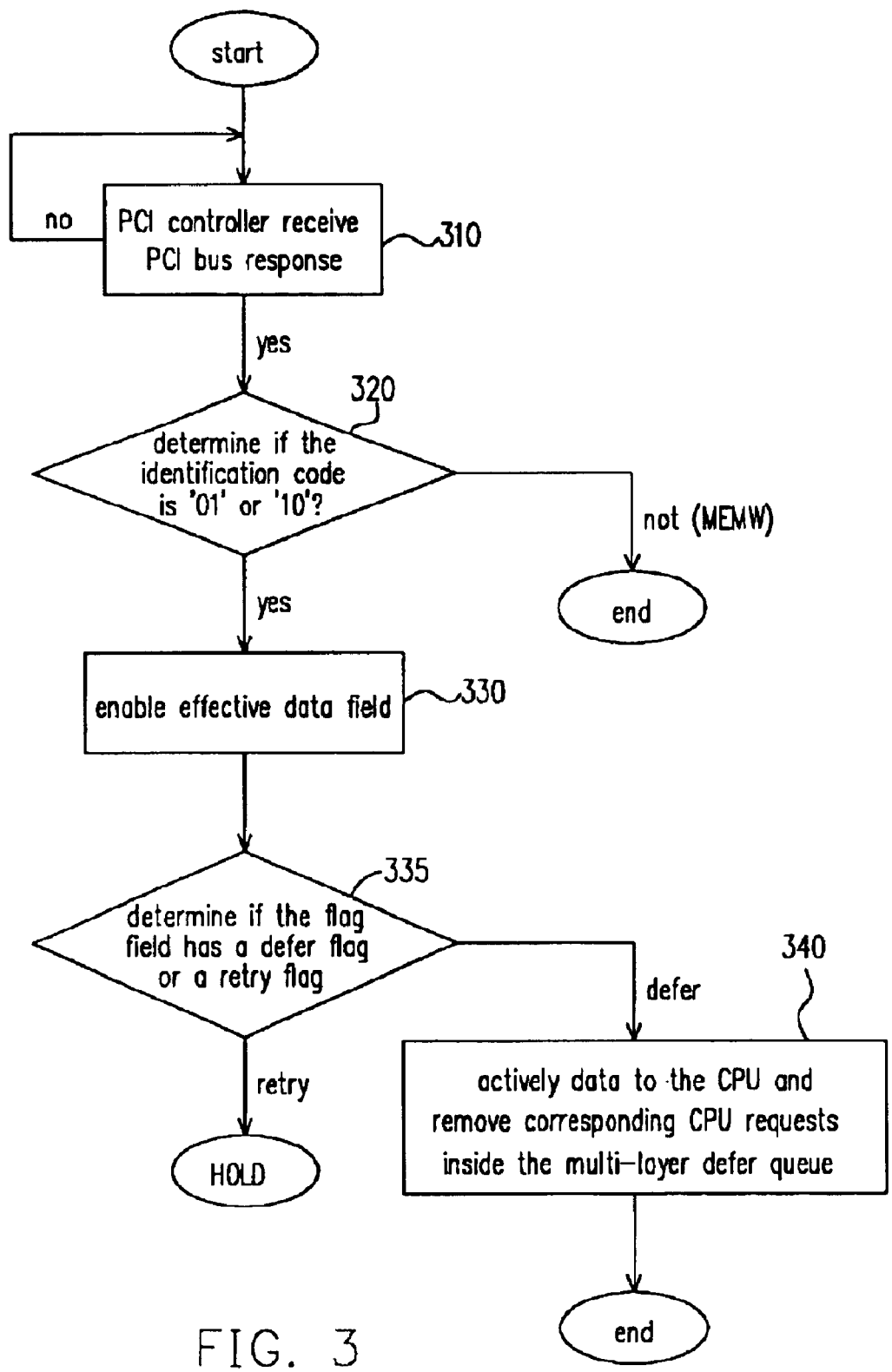
FIG. 3 is a flow chart showing the steps for a control chip having a multiple-layer defer queue therein to process a PCI bus response picked up from a PCI bus according to one preferred embodiment of this invention.

FIG. 2 is a flow chart showing the steps for a control chip having a multiple-layer defer queue therein to process CPU requests picked up from a CPU bus according to one preferred embodiment of this invention. FIG. 3 is a flow chart showing the steps for a control chip having a multiple-layer defer queue therein to process a PCI bus response picked up from a PCI bus according to one preferred embodiment of this invention. The following is a full description of the operation of the control chip with reference to FIGS. 1, 2 and 3.

The control chip 10 receives a CPU request through the CPU bus 102. Then the CPU request is transferred to the PCI request queue 106 for storage (in step s200). If the CPU request is a first-type request, that is, an input/output read request, an input/output write request or a memory read request (in the step s202), then it is checked whether or not the first-type request is existing in the multi-layer DFQ 104 (as shown in step s208).

When the multi-layer DFQ 104 has stored the first-type request, the effective data field of the request record in the DFQ is check whether or not is an enable (in step s210). In the situation of disable, the control chip issues a retry response to the CPU (in step s216). The identification code field of the PCI request record is filled with 00 (in step s218) and the request is accomplished. In the situation of enable, the control chip will respond to the CPU with the data and the transaction accomplishes. The first-type request stored in the multi-layer DFQ is deleted (in step s212). The identification code field of the PCI request record is filled with 00 (in step s214) and the request is accomplished.

When the multi-layer DFQ 104 has not stored the first-type request, and the multi-layer DFQ 104 still has no sufficient storage space (as shown in step s220), then the control chip issues a retry response to CPU (as shown in step s216). Then, the identification code field of the PCI request record is filled with 00 (as shown in step s218), and the request is accomplished.

When the multi-layer DFQ 104 has not stored the first-type request, and when the multi-layer DFQ 104 still has storage space (in step s220), then an identification code of 01 or 10 is assigned to both of the identification code field of the request record of DFQ and the request record of PCI queue (in step s222). It is judged whether or not the first-type request can provide defer response (in step s224). If the first-type request can provide defer response, then a defer flag is assigned to the flag field of the request record in DFQ (in step s226). The defer response is responded to CPU bus 102 (in step s228). If the first-type request cannot provide defer response, then a retry flag is assigned to the flag field of the request record in DFQ (in step s230) and the retry response is responded to the CPU bus 102 (in step s232). Then, the PCI request record in the PCI request queue 106 is stored in the PCI access queue 108 (in step s206). After that, the PCI controller 110 takes out the first-type request of the PCI access queue 108 and sends it to the PCI bus 112 (in step 234).

When the CPU request is a second-type request, that is, a write-in request for the memory, then an identification code of 00 is assigned to the identification code field of the PCI request record in the PCI access queue (in step s204), and an accomplishing response is responded to the CPU bus 102 (in step s236), and the transaction is accomplished. Then, the PCI request record in the PCI request queue 106 is stored into the PCI access queue 108 (in step s206). Afterward, the PCI controller 110 takes out the second-type request of the PCI access queue 108 and sends it to the PCI bus 112 (in step 234).

When the PCI controller 110 receives a response from the PCI bus 112 and the requested data (in step s310), the PCI controller 110 first judges whether or not the identification code field is filled with 01 or 10 (in step s320). If the identification code is not the 01 or 10, it indicates that the request is a second-type request. If the identification code is 01 or 10, then a DFQ request record with a value in the identification code field being the same as the value of the identification code is searched from the request records in the multi-layer DFQ 104, according to the value of the identification code. Then, the effective data field of the DFQ request record, which has the value in the identification code field being the same as the value of the identification code, is enabled (in step s330). Afterward, the flag field is judged whether it indicates a defer response or a retry response (in step s335). If the flag field of the DFQ request record, which has the value in the identification code field being the same as the value of the identification code, is a defer flag, then the control chip 10 actively sends the requested data to the CPU bus 102. Also and the request record, having the value in the identification code field being the same as the value of the identification code, is deleted (in step s340). If the flag field of the DFQ request record, which has the value in the identification code field being the same as the value of the identification code, is a retry flag, then the control chip 10 temporarily stores this data until the same first-type request is again issued to the control chip.

In conclusion, major advantages of this invention includes:

1. The system is capable of processing a plurality of first-type requests from the CPU. Moreover, the multiple-layer defer queue supports retry and defer transactions concurrently.

2. The amount of data shuttling between the CPU and the control chip is greatly reduced so that the system efficiency and performance is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of operating a control chip having a multiple-layer defer queue between a first bus and a second bus, the method comprising:

storing a request in the multiple-layer defer queue, wherein the request is issued by the first bus, and the multiple-layer defer queue also provides a request record with respect to the request;

issuing a defer response or a retry response with respect to the request to the first bus;

issuing the request to the second bus;

receiving a responded data with respect to the request from the second bus;

providing the responded data to the first bus if the defer response issues to the first bus; and providing the responded data to the first bus if the retry response issues to the first bus and only when the first bus again issues the request, wherein after the step of providing the responded data to the first bus, the corresponding request and the corresponding request record in the multiple-layer defer queue are deleted.

2. A method of operating a control chip having a multiple-layer defer queue between a first bus and a second bus, the method comprising:

storing a request in the multiple-layer defer queue, wherein the request is issued by the first bus, and the multiple-layer defer queue also provides a request record with respect to the request;

issuing a defer response or a retry response with respect to the request to the first bus;

issuing the request to the second bus;

receiving a responded data with respect to the request from the second bus;

providing the responded data to the first bus if the defer response issues to the first bus; and providing the responded data to the first bus if the retry response issues to the first bus and only when the first bus again issues the request, wherein the request record comprises:

an identification code field, used to store an identification code with respect to the request;

a flag field, used to judge whether the request is one selected from the group consisting of the retry response and the defer response; and an effective data field, used to enable the effective data field when the responded data is received.

3. A method of operating a control chip having a multiple-layer defer queue between a first bus and a second bus, the method comprising:

storing a plurality of requests issued from the first bus in the multiple-layer defer queue, wherein each of the requests has corresponding one response selected from the group consisting of a retry response and a defer response to be responded to the first bus, wherein the multiple-layer defer queue also provides a request record with respect to each of the requests;

sequentially issuing the requests to the second bus, wherein the requests at least includes a first request;

receiving a responded data with respect to the fist request from the second bus;

providing the responded data to the first bus if the defer response with respect to the first request issues to the first bus; and providing the responded data to the first bus if the retry response with respect to the first request issues to the first bus and only when the first bus again issues the first request, wherein after the step of providing the responded data to the first bus, the corresponding one of the requests and the request record in the multiple-layer defer queue are deleted.

4. A method of operating a control chip having a multiple-layer defer queue between a first bus and a second bus, the method comprising:

storing a plurality of requests issued from the first bus in the multiple-layer defer queue, wherein each of the requests has corresponding one response selected from the group consisting of a retry response and a defer response to be responded to the first bus, wherein the multiple-layer defer queue also provides a request record with respect to each of the requests;

subsequentially issuing the requests to the second bus, wherein the requests at least includes a first request;

receiving a responded data with respect to the first request from the second bus;

providing the responded data to the first bus if the defer response with respect to the first request issues to the first bus; and providing the responded data to the first bus if the retry response with respect to the first request issues to the first bus and only when the first bus again issues the first request, wherein the request record comprises:

an identification code field, used to store an identification code with respect to each of the requests;

a flag field, used to judge whether each of the requests is one selected from the group consisting of the retry response and the defer response; and an effective data field, used to enable the effective data field when the responded data with respect to each of the requests is received.

5. The method of claim 4, wherein when the first bus again issues the first request, an effective bit of the effective data field should be checked to be an enable status, then the responded data is sent to the first bus.

6. A method of operating a control chip having a multiple-layer defer queue between a first bus and a second bus, the method comprising:

storing a request in the multiple-layer defer queue, wherein the request is issued by the first bus, and the multiple-layer defer queue also provides a request record with respect to the request, the request record being used for judging whether the request is a retry response or a defer response;

issuing the defer response or the retry response with respect to the request to the first bus;

issuing the request to the second bus;

receiving a responded data with respect to the request from the second bus;

providing the responded data to the first bus if the defer response issues to the first bus; and providing the responded data to the first bus if the retry response issues to the first bus and only when the first bus again issues the request.

* * * * *